(12) United States Patent
Kwon et al.

(10) Patent No.: US 9,397,330 B2
(45) Date of Patent: Jul. 19, 2016

(54) ELECTRODE, LITHIUM BATTERY, METHOD OF MANUFACTURING ELECTRODE, AND COMPOSITION FOR COATING ELECTRODE

(75) Inventors: Moon-seok Kwon, Hwaseong-si (KR); Seon-mi Yoon, Yongin-si (KR); Jae-man Choi, Hwaseong-si (KR); Han-su Kim, Seoul (KR); Hyeon-jin Shin, Suwon-si (KR); Jae-young Choi, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 1625 days.

(21) Appl. No.: 12/184,580

(22) Filed: Aug. 1, 2008

(65) Prior Publication Data

US 2009/0181309 A1    Jul. 16, 2009

(30) Foreign Application Priority Data

Jan. 15, 2008    (KR) .................. 10-2008-0004590

(51) Int. Cl.
| | | |
|---|---|---|
| H01M 4/13 | (2010.01) | |
| H01M 4/62 | (2006.01) | |
| H01M 4/04 | (2006.01) | |
| H01M 4/139 | (2010.01) | |
| B82Y 30/00 | (2011.01) | |
| H01M 4/58 | (2010.01) | |

(Continued)

(52) U.S. Cl.
CPC .............. *H01M 4/13* (2013.01); *H01M 4/0419* (2013.01); *H01M 4/139* (2013.01); *H01M 4/625* (2013.01); *B82Y 30/00* (2013.01); *H01M 4/5825* (2013.01); *H01M 10/052* (2013.01); *H01M 2004/021* (2013.01); *Y02E 60/122* (2013.01)

(58) Field of Classification Search
CPC ......... H01M 4/02; H01M 2/28; H01M 4/133; H01M 4/663; H01M 4/666; H01M 8/0234; B82Y 30/00; H01G 11/32
USPC ............................................... 429/523; 3/523
See application file for complete search history.

(56) References Cited

U.S. PATENT DOCUMENTS

| | | | | |
|---|---|---|---|---|
| 6,653,020 B2 * | 11/2003 | Amatucci | ............... | H01M 4/58 429/229 |
| 2002/0008956 A1 * | 1/2002 | Niu | ......... | H01G 9/155 361/502 |

(Continued)

FOREIGN PATENT DOCUMENTS

| | | |
|---|---|---|
| CN | 1567615 | 1/2005 |
| CN | 1917277 A | 2/2007 |

(Continued)

OTHER PUBLICATIONS

Zhang et al. Materials Today, Review: Carbon Nanotubes in different Shape, 2009.*

(Continued)

*Primary Examiner* — Sally Merkling
(74) *Attorney, Agent, or Firm* — Stein IP, LLC

(57) ABSTRACT

An electrode including a current collector, and an active material layer disposed on the current collector. The active material layer includes a structural network and an active material composition. The structural network includes a network of carbon nanotubes and a binder. The active material composition includes an active material and a polar medium.

8 Claims, 3 Drawing Sheets

(51) Int. Cl.
    *H01M 10/052*     (2010.01)
    *H01M 4/02*     (2006.01)

(56) References Cited

U.S. PATENT DOCUMENTS

| | | | |
|---|---|---|---|
| 2004/0248010 | A1 | 12/2004 | Kato et al. |
| 2005/0042450 | A1* | 2/2005 | Sano et al. .................. 428/375 |
| 2005/0236984 | A1 | 10/2005 | Aoyama et al. |
| 2005/0239917 | A1* | 10/2005 | Nelson et al. ................ 523/160 |
| 2007/0190413 | A1* | 8/2007 | Lee et al. ................. 429/218.1 |
| 2007/0202403 | A1* | 8/2007 | Oh et al. ..................... 429/217 |
| 2010/0092868 | A1* | 4/2010 | Kim et al. ................. 429/231.8 |

FOREIGN PATENT DOCUMENTS

| | | |
|---|---|---|
| CN | 101243566 A | 8/2008 |
| EP | 1 391 948 | 2/2004 |
| JP | 7-254139 | 10/1995 |
| JP | 9-97625 | 4/1997 |
| JP | 9-316760 | 12/1997 |
| JP | 10-45225 | 2/1998 |
| JP | 11-283629 A | 10/1999 |
| JP | 2003-21842 | 1/2003 |
| JP | 2003-077476 | 3/2003 |
| JP | 2005-317251 | 11/2005 |
| KR | 1999-021294 | 3/1999 |
| KR | 2000-0018898 | 4/2000 |
| KR | 2003-0053114 | 6/2003 |
| WO | WO 2007/004652 A1 | 1/2007 |
| WO | WO 2007/04652 A1 | 1/2007 |
| WO | WO 2007/029934 | 3/2007 |

OTHER PUBLICATIONS

Ma et al. Bull Chem Soc. Jpn 72, 2563-2566 (1999).*
Li et al., "A novel network composite cathode of $LiFePO_4$/multiwalled carbon nanotubes with high rate capability for lithium ion batteries," *Electrochemistry Communications*, vol. 9, No. 4. Apr. 1, 2007, pp. 663-666.
Mukhopadhyay et al., "Different methods of preparing electrode from single-wall carbon nanotubes and their effect on the Li ion insertion process," *J. Solid State Electrochem*, vol. 12, No. 6, Sep. 12, 2007, pp. 715-720.
European Search Report issued in European Patent Application No. 08165744.7 on May 12, 2009.
Xinwei Li, The First Office Action, Jun. 15, 2012, pp. 1-7 (English); 1/5-5/5 (Chinese).
Office Action issued by Japanese Patent Office on Jul. 30, 2013 in corresponding Japanese Application 2008-303095.
Japanese Final Office Action issued Jun. 24, 2014, by the Japanese Patent Office, issued to Japanese Application No. 2008-303095.

* cited by examiner

ELECTRODE, LITHIUM BATTERY, METHOD OF MANUFACTURING ELECTRODE, AND COMPOSITION FOR COATING ELECTRODE

CROSS-REFERENCE TO RELATED PATENT APPLICATION

This application claims the benefit of Korean Patent Application No. 2008-4590, filed on Jan. 15, 2008, in the Korean Intellectual Property Office, the disclosure of which is incorporated herein in its entirety by reference.

BACKGROUND OF THE INVENTION

1. Field of the Invention

Aspects of the present invention relate to an electrode, a lithium battery including the electrode, a method of manufacturing the electrode, and a composition for coating the electrode.

2. Description of the Related Art

Electrodes of a secondary cell include a metal current collector and an active material layer formed on the metal current collector. The active material layer includes an active material, a conductive material, a binder, and/or a surfactant. The conductive material is used for increasing the conductivity of the active material layer and for increasing the interfacial conductivity between the metal current collector and the active material layer. Although the conductive material improves the charging and discharging characteristics of the secondary cell, since the conductive material is not adhesive, the conductive material can be electrically disconnected, due to cracks generated during charging and discharging operations of the secondary cell.

The binder is included in the active material layer to reduce volume changes of the active material layer, during the charging and discharging operations, and thereby prevents the formation of cracks in the electrode. Although the binder is useful for preventing cracks, the binder is not conductive. Therefore, both the conductive material and the binder need to be included in the active material layer, and thus, it is difficult to improve both the conductivity and the binding strength of the active material layer. In other words, if both the conductivity and binding strength of an active material layer of a secondary cell can be increased, the charging and discharging characteristics of the secondary cell can be greatly improved.

In Japanese Patent Publication No. 9-97625, an adhesive conductive layer is interposed between a current collector and an active material layer, to form an electrode having improved conductivity and binding strength.

SUMMARY OF THE INVENTION

Aspects of the present invention provide an electrode including an active material layer formed on a current collector. The active material layer includes a structural network comprising a network of carbon nanotubes and a binder.

Aspects of the present invention also provide a lithium battery including the electrode.

Aspects of the present invention also provide a method of preparing an electrode. The method includes: forming a coating layer by coating a dispersion containing carbon nanotubes and a binder on a current collector; and forming an active material layer by printing electrode ink on the coating layer.

Aspects of the present invention also provide a composition for coating an electrode. The composition includes a solvent and a solid component. The solid component includes 5 to 1000 parts by weight of a binder, per 100 parts by weight of carbon nanotubes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
FIG. 1 is an electron micrograph of a cross section of an active material layer including a structural network, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

According to an exemplary embodiment of the present invention, an electrode includes a current collector and an active material layer formed on the current collector. The active material layer can include an active material composition and a structural network.

The structural network includes carbon nanotubes and a binder. The carbon nanotubes are disposed in a three dimensional arrangement and are electrically connected to one another. The binder binds the carbon nanotubes to one another. The carbon nanotubes form a conductive network within the structural network. Therefore, the structural network can be considered a conductive material. The three-dimensional arrangement of the carbon nanotubes is maintained by the binder. Therefore, the structural network can act as a supporting framework for the active material layer, to reduce volume changes of the active material layer, during charging and discharging operations. Therefore, without using excessive amounts of conductive and binder materials, the electric potential of the active material layer can be uniformly maintained, and cracking of the active material layer can be prevented, during charging and discharging operations. As a result, a battery using the electrode can have enhanced cycle-life characteristics.

The structural network has a net shape, as illustrated in FIG. 1. The structural network functions as a structural frame of the active material layer.

In another exemplary embodiment of the present invention, a dispersant can be included in the structural network. If the binder can act as a dispersant, an additional dispersant may not be necessary. Any conventional dispersant can be used. For example, a cationic dispersant, an anionic dispersant, and/or an amphoteric dispersant can be used.

The carbon nanotubes may be electrically connected to each other in a variety of ways. For example, at least one of the carbon nanotubes can be electrically connected to at least three other carbon nanotubes. When there are many electric contacts between the carbon nanotubes, a conductive pathway between any two points of the active material layer can be shortened, and thus, the conductivity of the structural network can be increased. In addition, when there are many electrical contacts between the carbon nanotubes, the carbon nanotubes can be physically connected to each other more securely, by the binder, and thus, the strength and durability of the structural network can be increased.

Figure 2:
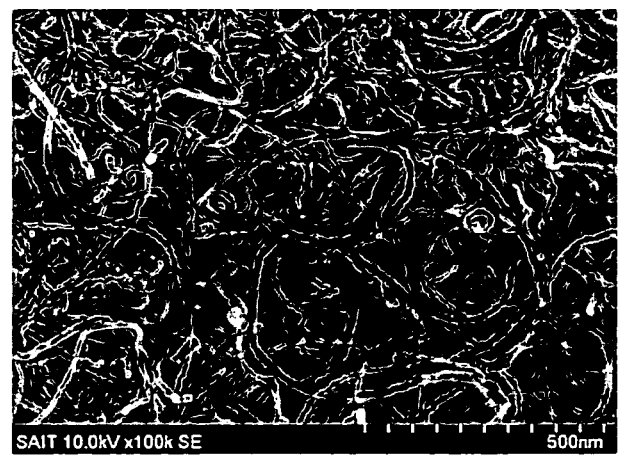
FIG. 2 is an electron micrograph of a structural network, according to an exemplary embodiment of the present invention.

FIG. 2 is an electron micrograph illustrating the structural network before the structural network is incorporated into an active material layer. Referring to FIG. 2, the carbon nanotubes form a three dimensional network, and a plurality of contacts are formed between the carbon nanotubes.

Two arbitrary points in the structural network may be electrically connected to each other and to the current collector. The structural network is disposed within the active material layer, and the structural network provides conductive pathways through the active material layer, such that the active material layer can have a uniform potential distribution.

In another exemplary embodiment of the present invention, the carbon nanotubes may have an aspect ratio of 10, or greater. In this case, the carbon nanotubes can easily be connected to form the structural network. However, if the aspect ratio of the carbon nanotubes is less than 10, the carbon nanotubes may be too short, such that the carbon nanotubes may not sufficiently contact one another, and thus, it may be difficult to form the structural network.

The carbon nanotubes can be any suitable type of carbon nanotube. For example, the carbon nanotubes can be single-wall carbon nanotubes, double-wall carbon nanotubes, multi-wall carbon nanotubes, bundle-type carbon nanotubes, or a combination thereof. Carbon nanotubes having a high electrical conductivity may be particularly suitable.

In another exemplary embodiment of the present invention, the structural network is combined with active material composition, to form an active material layer. In such a case the nanotubes may make up approximately 0.01% to 20% of the total weight of the active material layer. If the carbon nanotubes make up less than about 0.01% of the weight of the active material layer, the structural network may not be properly formed. On the other hand, if the carbon nanotubes that make up more than 20% of the weight of the active material layer, the combined structure has a relatively low active material content. Thus, the capacity of the electrode per unit volume may be reduced.

In another exemplary embodiment of the present invention, the structural network may have carbon content that is approximately 1.3 times, or more, than that of the active material composition. For example, the structural network may have carbon content of about two times greater than that of the active material composition. Since the structural network includes the carbon nanotubes as a main component, the carbon content of the structural network is higher than that of the active material composition. The carbon content can be measured by Rutherford backscattering spectrometry (RBS).

In another exemplary embodiment of the present invention, the structural network can be disposed as a conductive layer between the current collector and an active material composition layer. The conductive layer and the active material composition layer can be separate layers. Alternatively, the conductive layer can exist as a separate layer only before the active material composition is applied thereto, so as to form a single active material layer. That is, the active material composition layer can be incorporated into the conductive layer, after the electrode fabrication is completed. In the former case, the conductive layer can be an adhesive layer to adhere the current collector to the active material composition layer. In the latter case, the active material composition is distributed within the structural network of the conductive layer, during the fabrication of the electrode. Alternatively, the active material composition can be disposed in only a portion of the conductive layer, for example, a surface portion of the conductive layer.

The conductive layer may have a thickness in the range from about 5 nm to about 1000 nm. If the thickness of the conductive layer is greater than 1000 nm, the capacity of the electrode per unit volume can decrease. It may be difficult to form a conductive layer that is thinner than about 5 nm.

The active material composition can be formed of any conventional active material, conductive material, binder, and/or surfactant. The active material composition can be an electrode ink. The electrode ink can be applied to the conductive layer, by an inkjet printing method, to form an electrode. Alternatively, the electrode can be formed by coating a current collector with the active material composition, using a doctor blade.

In another exemplary embodiment of the present invention, a lithium battery including the electrode is provided. In detail, the electrode can be formed with the electrode ink, by an inkjet printing method. Alternatively, the electrode can be formed by coating a current collector with the active material composition, using a doctor blade. The lithium battery can have various structures and applications. For example, the lithium battery can be a primary lithium battery, a secondary lithium battery, or a fuel cell.

In another exemplary embodiment of the present invention, there is provided a method of preparing an electrode. The method includes: forming a coating layer by coating a dispersion containing carbon nanotubes and a binder on a current collector; and forming an active material layer by printing an electrode ink on the coating layer.

In another exemplary embodiment of the present invention, the dispersion may further contain a dispersant. If the binder of the dispersion can function as a dispersant, an additional dispersant may not be necessary. Any conventional dispersant can be used. For example, a cationic dispersant, an anionic dispersant, and/or an amphoteric dispersant can be used.

The dispersion is prepared by mixing carbon nanotubes and a binder in a solvent and removing precipitates from the mixture, by centrifugation. The current collector can be coated with the dispersion by various methods, such as a spray coating method, to form the coating layer. The coating layer has a structural network including the carbon nanotubes and the binder. The structural network may further include a dispersant. When the electrode ink is applied to the coating layer, the carbon nanotubes and the binder of the structural network are mixed with the electrode ink. In other words, the carbon nanotubes and the binder are included in the active material composition layer, formed of the electrode ink.

Depending on the number of applications of the electrode ink and the dispersion, and the kind of solvents used for fabricating the electrode ink and the dispersion, the coating layer and the active material composition layer (electrode ink layer) can be completely or partially mixed. That is, when the dispersion and the electrode ink are completely mixed, the coating layer may be not present as a separate layer, i.e., the structural network and the active material composition may form a single active material layer. When the coating layer and the active material composition are partially mixed, the coating layer and the active material composition can form separate layers.

The coating layer may have a thickness in the range from about 5 nm to about 1000 nm. If the thickness of the coating layer is greater than about 1000 nm, the capacity of the electrode per unit volume can be decreased. It is difficult to form a coating layer that is thinner than about 5-nm.

The electrode ink may include the same solvent as that included in the dispersion. In this case, the solvent facilitates the mixing of the dispersion and the electrode ink. That is, the coating layer and the electrode ink can be completely mixed, and thus, the coating layer may not be present as a separate layer. As a result, the structural network of the coating layer may be completely incorporated into the active material composition layer. If the electrode ink includes a solvent that is immiscible with the carbon nanotubes and/or the binder of the coating layer, the coating layer and the active material composition layer may exist as separate layers.

In another exemplary embodiment of the present invention, the dispersion may include 100 parts by weight of a solvent, per 0.1 to 100 parts by weight of a solid component. The solid component may include 5 to 1000 parts by weight of the binder, per 100 parts by weight of the carbon nanotubes. Within the above-mentioned range, the structural network can be easily formed on a surface of the electrode. Outside the above-mentioned range, the structural network may be unstable, due to a low binding strength, and the structural network may have a low conductivity, due to the high concentration of the binder.

In another exemplary embodiment of the present invention, the solid component may further include not more than 50 parts by weight of a dispersant, per 100 parts by weight of the carbon nanotubes. For example, the solid component can include 0.01 to 50 parts by weight of the dispersant, per 100 parts by weight of the carbon nanotubes. If the solid component includes more than 50 parts by weight of the dispersant, the conductivity and strength of the structural network can decrease, and the volume specific capacity of the electrode can decrease.

In another exemplary embodiment of the present invention, a composition for coating an electrode is provided. The composition includes a solvent and a solid component, and the solid component includes 5 to 1000 parts by weight of a binder, per 100 parts by weight of the carbon nanotubes. The composition may include 100 parts by weight of the solvent; and 0.1 to 100 parts by weight of the solid component, per 100 parts by weight of the carbon nanotubes. The composition can form a structural network including the carbon nanotubes and the binder on an electrode. If the solid component content is less than the above-mentioned range, coating efficiency may decrease. On the contrary, if the solid component content is greater than the above-mentioned range, it may be difficult to form a uniform structural network layer having a thickness of less than approximately 1000 nm.

In another exemplary embodiment of the present invention, the solid component may further include not more than 50 parts by weight of a dispersant, per 100 parts by weight of the carbon nanotubes. For example, the solid component can further include 0.01 to 50 parts by weight of a dispersant, per 100 parts by weight of the carbon nanotubes. If the solid component includes more than about 50 parts by weight of a dispersant, per 100 parts by weight of the carbon nanotubes, the conductivity and strength of the structural network can decrease, and the volume specific capacity of the electrode can decrease.

A Method of fabricating an electrode and a battery will now be described in more detail. First, an electrode ink is prepared. The electrode ink can be prepared by mixing an active material, a polar medium, and a moisturizing agent. A conductive material, a binder, a dispersant, a lithium salt, and/or a buffer agent can be added to the electrode ink.

The active material may be a lithium containing metal oxide, a transition metal oxide not including lithium, and/or a carbon based material. Examples of the lithium containing metal oxide include Li—Co based metal oxides such as $LiCoO_2$; Li—Ni based metal oxides such as $LiNiO_2$; Li—Mn based metal oxides such as $LiMn_2O_4$ and $LiMnO_2$; Li—Cr based metal oxides, such as $Li_2Cr_2O_7$ and $Li_2CrO_4$; Li—Fe based metal oxides such as $LiFePO_4$; Li—V based metal oxides; and Li—Ti based metal oxides such as $Li_4Ti_5O_{12}$. Examples of the transition metal oxide not including lithium include $SnO_2$, $In_2O_3$, and $Sb_2O_3$. Examples of the carbon based material include graphite, hard carbon, acetylene black, and carbon black. The active material can be used as a positive-electrode or negative-electrode active material, according to the composition thereof.

The electrode ink can be a positive-electrode or a negative-electrode ink, depending on whether the active material is a positive-electrode or a negative-electrode active material. The electrode ink can include 0.1% to 10%, by weight, of the active material. However, the present invention is not limited thereto. The polar medium may include water as a main component and a polar organic solvent as a subsidiary component. Examples of the polar organic solvent include methanol, ethanol, butanol, propanol, isopropanol, isobutyl alcohol, and N-methyl-2-pyrrolidone. The sentence "the polar medium includes water as a main component" indicates that the water content of the polar medium is equal to, or greater than, 51% by weight. The remaining portion is the subsidiary component. For example, the electrode ink may include 50% to 90%, by weight, of the polar medium.

The moisturizing agent is used to reduce the volatility of the polar medium. A glycol based material can be used as the moisturizing agent. Examples of the glycol based material include ethylene glycol, diethylene glycol, and propylene glycol. The electrode ink may include 10% to 40%, by weight, of the moisturizing agent. However, the present invention is not limited thereto.

The conductive material can be used to increase the conductivity of particles of the active material. Any effective material can be used as the conductive material. For example, acetylene black, carbon black, graphite, carbon fiber, or a mixture thereof can be used as the conductive material. The electrode ink may include 0.1% to 10%, by weight, of the conductive material. For example, the electrode ink may include 0.1% to 3%, by weight, of the conductive material. However, the present invention is not limited thereto.

The binder can be used to form a bond between a current collector and a layer of the electrode ink. Any proper binder can be used. For example, the binder can be polyvinyl alcohol, polyimide, ethylene-propylene-diene terpolymer, styrene-butadiene rubber, polyvinylidene fluoride (PVdf), polytetrafluoroethylene, tetrafluoroethylene-hexafluoropropylene copolymer, carboxymethyl cellulose (CMC), or a mixture thereof. The electrode ink may include 0.01% to 10% by weight of the binder. For example, the electrode ink may include 0.05% to 5% by weight of the binder. However, the present invention is not limited thereto.

The dispersant can be used to disperse particles of the oxide and the conductive material. Any effective dispersant can be used. Examples of the dispersant include a fatty acid salt, an alkyl dicarboxylic acid salt, an alkyl sulfuric ester salt, a polysulfuric ester salt, an alkyl naphthalene sulfate, an alkyl benzene sulfate, an alkyl naphthalene sulfuric ester salt, an alkyl sulfone succinic acid salt, a naphthenic acid salt, an alkyl ether carboxylic acid salt, an acylated peptide, an alpha olefin sulfate, an N-acyl methyl taurine salt, an alkyl ether sulfate, a secondary polyol ethoxy sulfate, a polyoxymethylene alkyl phenyl ether sulfate, a monoglysulfate, alkyl ether phosphoric ester salt, an alkyl phosphoric acid ester salt, an alkyl amine salt, an alkyl pyridium salt, an alkyl imidazolium salt, an fluorine acrylic copolymer, a silicon based acrylic copolymer, a polyoxyethylene alkyl ether, a polyoxymethylene sterol ether, a linoleic derivative of polyoxyethylene, a polyoxymethylene-polyoxypropylene copolymer, a polyoxyethene sorbitan fatty acid ester, a monoglyceride fatty acid ester, a sucrose fatty acid ester, an alkane alkanolamide fatty acid, a polyoxymethylene fatty acid amide, a polyoxyethylele alkyl amine, a polyvinyl alcohol, a polyvinyl cellulose based resin, an acryl based resin, a butadiene based resin, a styrene-acryl based copolymer resin, a polyester based resin, a polyamide based resin, a polyurethane based resin, an alkyl betaine, an alkyl amine oxide, a phosphatidyl choline, and mixtures thereof.

The lithium salt is used to increase the ion conductivity of the electrode ink. Any suitable lithium salt can be used. For example, the lithium salt can be $LiPF_6$, $LiBF_4$, $LiClO_4$, $LiAsF_6$, $LiTaF_6$, $LiAlCl_4$, or $Li_2B_{10}Cl_{10}$.

The buffering agent can be used to stabilize the electrode ink and maintain the electrode ink at a proper pH level. Any effective buffering agent can be used. For example, the buffering agent can be an amine based buffer agent, such as trimethyl amine, triethanol amine, diethanol amine, and ethanol amine; sodium hydroxide; ammonium hydroxide; or a mixture thereof. The electrode ink may include 0.1% to 10%, by weight, of the buffering agent. For example, the electrode ink can include 0.1% to 5%, by weight, of the buffering agent. However, the present invention is not limited thereto.

The electrode ink is applied to a current collector, by an inkjet method, during the formation of an electrode. According to the inkjet method, droplets of the electrode ink are ejected onto the current collector, through a nozzle of an inkjet printer. The inkjet method can be performed using a thermal- or piezoelectric device. For example, when the thermal stability of the electrode ink is important, the inkjet method may be performed using the piezoelectric device. If a positive electrode ink containing a positive active material is applied to the current collector, a positive electrode is formed. If a negative electrode ink containing a negative electrode active material is applied to the current collector, a negative electrode is formed.

The electrode ink can be applied to the current collector, by the inkjet method, in various ways. For example, the electrode ink can be ejected onto the current collector, through a printhead of an inkjet printer, to form a predetermined pattern, by manipulating a commercial computer connected to the inkjet printer, using a proper application program. The electrode ink applied to the current collector can be dried in a vacuum chamber, at a temperature of about 20° C. to 200° C., for from about 1 minute to about 8 hours. However, the present invention is not limited thereto.

Any well-known material can be used to form the current collector. For example, the current collector can be formed with an aluminum thin film, a stainless thin film, a copper thin film, or a nickel thin film.

In another exemplary embodiment of the present invention, a method of fabricating a lithium battery is provided. For example, a positive electrode can be formed by applying positive electrode ink to one side of a current collector, by an inkjet method, and then drying the applied positive electrode ink. Thereafter, a negative electrode can be formed by applying negative electrode ink to the other side of the current collector, by the inkjet method, and then drying the applied negative electrode ink. That is, a bipolar electrode can be formed.

An electrolyte material is applied to the positive electrode side and/or the negative electrode side of the bipolar electrode, to a predetermined thickness, and then the electrolyte material is dried, to form an electrolyte layer. Bipolar electrodes prepared in this way are stacked in an inert gas atmosphere, to form an electrode stack structure. A lithium battery can be formed by packing the electrode stack structure, in an insulation material.

Aspects of the present invention will now be described in more detailed, according to the following examples. However, the present invention is not limited thereto.

Fabrication Example 1

Preparation of Electrode Ink 58.3 g of water, 5.7 g of ethanol, 30.9 g of ethylene glycol, 1.9 g of diethylene glycol, 0.38 of triethanol amine, 1.52 g of $LiFePO_4$, 0.19 g of dispersant (Ciba, Switzerland, EFKA4580), and 0.05 g of carboxymethyl cellulose (CMC) were mixed to form a mixture. The mixture was passed through a membrane syringe filter having a pore size of about 5 μm. In this way, an electrode ink (active material composition) was prepared.

Example 1

Preparation of Dispersion 15 mg of CMC was dissolved in 30 ml of distilled water, and 30 mg of multi-wall carbon nanotubes (ILJIN nanotech, Korean, CM-95) were added to the mixture. Thereafter, the resulting mixture was treated using ultrasonic waves, to disperse the CMC and the carbon nanotubes. Then, the mixture was centrifuged at 10000 rpm, for 10 minutes, to remove precipitates and to obtain a dispersion, in which the carbon nanotubes and the CMC were dispersed.

Example 2

Fabrication of Electrode

The dispersion of Example 1 was sprayed (coated) onto an aluminum current collector, using a spraying device (NVD-600, Fujimori Technology Laboratory Inc.). Spraying conditions were as follows: substrate temperature 70° C.; nozzle speed 600 mm/sec; nozzle-to-substrate distance 10 cm; spraying pitch 10 mm; spraying range 15 cm×15 cm; and injection rate 1 ml/min. The spraying of the dispersion was performed 15 times. A coating layer including a structural network was formed through the spraying of the dispersion. An electron micrograph of the structural network is illustrated in FIG. 2.

Thereafter, the aluminum current collector coated with the dispersion was cut into 10 cm×8 cm rectangle and then was attached to a poly ethylene telephthalate (PET) film. Then, an 8 cm×6 cm pattern was printed on the cut aluminum current collector, using the electrode ink of Fabrication example 1. For this, an HP Deskjet 5550 was used.

Next, the aluminum current collector was dried at about 80° C., for 10 minutes. An electrode was fabricated by repeating the printing and drying operations 15 times. The electrode was dried in a vacuum oven at about 120° C., for 2 hours, and then was rolled between rollers.

FIG. 1 is an electron micrograph illustrating a cross-section of the electrode. In FIG. 1, the upper dark region is the aluminum current collector, and the lower brighter region is an active material layer. In the active material layer, carbon nanotubes are arranged to form a structural network.

Example 3

An electrode was fabricated in the same way as Example 2, except that the spraying of the dispersion was performed 30 times.

Example 4

An electrode was fabricated in the same way as Example 2, except that the spraying of the dispersion was performed 60 times.

Example 5

An electrode was fabricated in the same way as Example 2, except that the spraying of the dispersion was performed 120 times.

Comparative Example 1

An electrode was fabricated in the same way as Example 2, except that the spraying of the dispersion was omitted.

Example 6

Fabrication of Lithium Battery

A 2016 coin cell was fabricated using an anode, a counter electrode, a separator, and an electrolyte. The electrode of Example 2 was used as the anode, and a lithium electrode was used as the counter electrode. A polyethylene separator was used. The electrolyte was prepared by adding 1.3 M of $LiPF_6$ (a lithium salt) to a solution including 30%, by volume, of ethylene carbonate and 70%, by volume, of diethyl carbonate.

Example 7 Through 9 and Comparative Example 2

Coin cells were fabricated in the same way as Example 6, except that the electrodes of Examples 3 through 5 and comparative example 1 were used instead of the electrode of Example 2.

Evaluation Example 1

Measurement of Carbon Content

After coating the current collector with the dispersion in Example 2, the electrode ink was applied to only a first portion of the current collector, by a printing method. An RBS test was performed on the first portion of the current collector and on a second uncoated portion of the current collector. The first portion will hereinafter be referred to as an active material layer region, and the second portion of the current collector will be referred to a structural network region. For the RBS test, an HRBS-V500 (Kobe Steel Company) was used.

Figure 3:
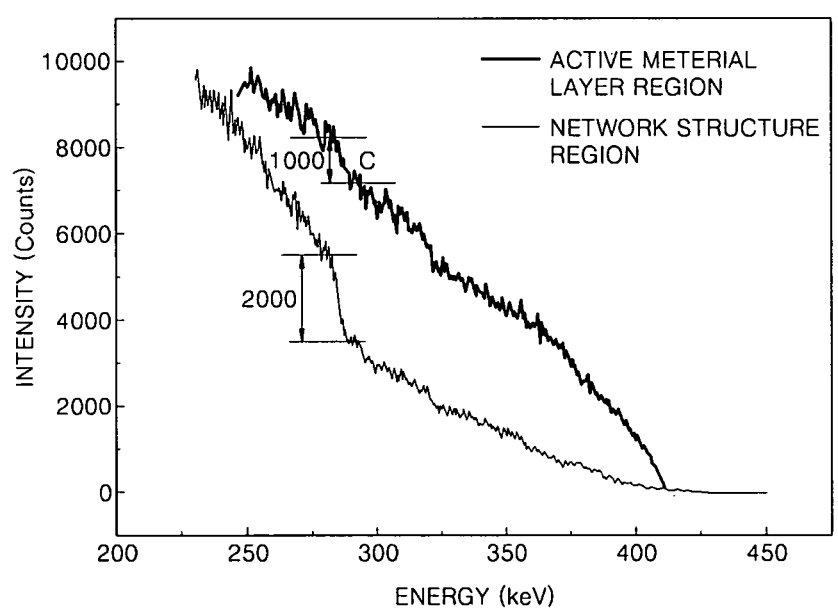
FIG. 3 is a graph illustrating the results of an RBS test performed on a surface with an active material layer, according to an exemplary embodiment of the present invention, and a comparative surface without an active material layer.

Results of the RBS test are shown in FIG. 3. In FIG. 3, the energy range of from approximately 260 KeV to 270 KeV corresponds to the activation energy of carbon atoms. Referring to FIG. 3, the carbon content of the structural network region is about twice that of the active material composition.

Evaluation Example 2

Evaluation of Charging and Discharging Characteristics

Figure 4:
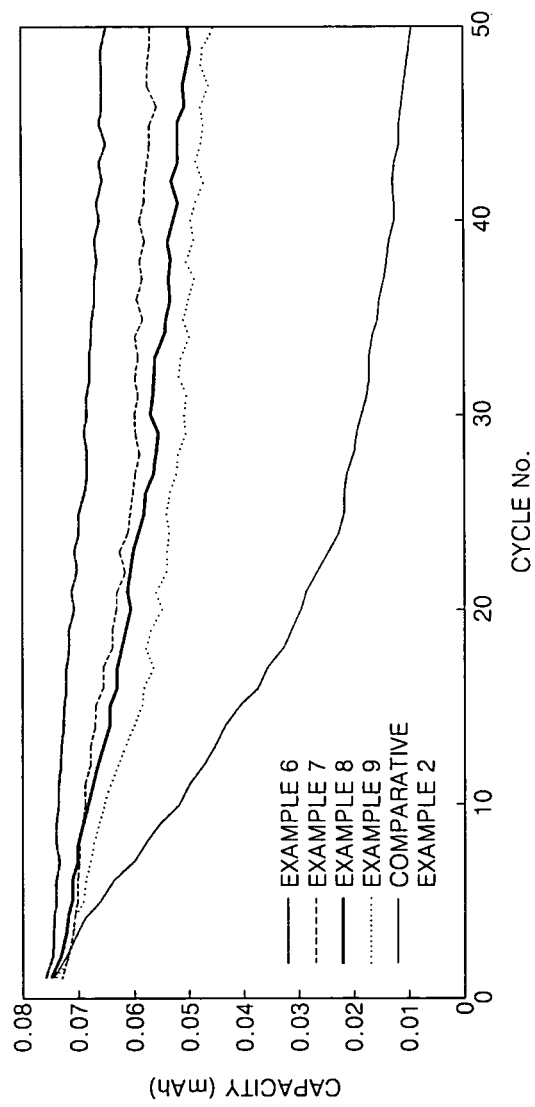
FIG. 4 is a graph illustrating results of a charging and discharging tests performed on lithium barriers of Examples 6 through 9 and Comparative Example 2.

The coin cells of Examples 6 through 9 and the Comparative Example 2 were charged at a constant current of about 15 mA per 1 g of positive electrode active material, until the potential of Li electrodes reached 4.1 V. Then, the coin cells were discharged at the same current, until the potential of the Li electrodes decreased to 2.7 V. The charging and discharging operations were performed 50 times. Results of the charging and discharging operations are shown in FIG. 4. A capacity retention rate was calculated from the results, using Equation 1 below, and the results are shown in Table 1.

50th capacity retention rate [%]=50th cycle discharge capacity/1st cycle discharge capacity. <Equation 1>

TABLE 1

|  | Capacity retention rate at 50th cycle [%] |
| --- | --- |
| Example 6 | 61.7% |
| Example 7 | 67.0% |
| Example 8 | 78.0% |
| Example 9 | 86.2% |
| Comparative Example 2 | 12.2% |

Referring to Table 1, the coin cells of Examples 6 through 9, which include electrodes having structural networks, had better capacity retention rates than the coin cell of Comparative Example 2, which includes an electrode having no structural network. As the structural network content increased, the capacity retention rates of the cells increased.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An electrode comprising:
   a current collector; and
   an active material layer disposed on the current collector, comprising,
      an active material composition;
      a conductive layer, disposed between the current collector and the active material, comprising a structural network comprising a network of electrically and directly connected curved carbon nanotubes bound to each other and a binder, wherein the amount of carbon nanotubes is higher than the amount of the binder in the structural network; and
      a mixture layer, wherein the structural network of the conductive layer is disposed within a portion of the active material layer to form the mixture layer, and wherein all of the active material of the active material layer consists of inorganic active material.

2. The electrode of claim 1, wherein the structural network further comprises a dispersant.

3. The electrode of claim 1, wherein the carbon nanotubes are electrically connected to each other.

4. The electrode of claim 3, wherein at least one of the carbon nanotubes is electrically connected to at least three other ones of the carbon nanotubes.

5. The electrode of claim 1, wherein the carbon nanotubes have an aspect ratio equal to, or greater than, 10.

6. The electrode of claim 1, wherein the carbon nanotubes are selected from the group consisting of single-wall carbon nanotubes, double-wall carbon nanotubes, multi-wall carbon nanotubes, bundle-type carbon nanotubes, or a combination thereof.

7. The electrode of claim 1, wherein the active material layer comprises about 0.01% to 20%, by weight, of the carbon nanotubes.

8. The electrode of claim 1, wherein the structural network has carbon content of at least about 1.3 times greater than that of the active material composition.

* * * * *